United States Patent [19]

Kawagoe et al.

[11] 4,440,140
[45] Apr. 3, 1984

[54] DIESEL ENGINE EXHAUST GAS RECIRCULATION CONTROL SYSTEM

[75] Inventors: Michio Kawagoe; Masaaki Tanaka, both of Susono, Japan

[73] Assignee: Toyota Jidosha Kabushiki Kaisha, Toyota, Japan

[21] Appl. No.: 398,446

[22] Filed: Jul. 14, 1982

[30] Foreign Application Priority Data

Aug. 27, 1981 [JP] Japan .................................. 56-134511

[51] Int. Cl.³ ............................................. F02M 25/06
[52] U.S. Cl. .................................. 123/571; 364/431.06
[58] Field of Search ............................... 123/571, 569; 364/431.06

[56] References Cited

U.S. PATENT DOCUMENTS

| | | | |
|---|---|---|---|
| 4,237,837 | 12/1980 | Toda et al. | 123/569 |
| 4,281,631 | 8/1981 | Yamaguchi | 123/571 |
| 4,300,516 | 11/1981 | Hayakawa | 123/571 |
| 4,354,476 | 10/1982 | Straubel | 123/571 |
| 4,369,753 | 1/1983 | Sugiyama | 123/571 |
| 4,378,776 | 4/1983 | Nishimori | 123/571 |
| 4,390,001 | 6/1983 | Fusimoto | 123/571 |

*Primary Examiner*—Wendell E. Burns
*Attorney, Agent, or Firm*—Oblon, Fisher, Spivak, McClelland & Maier

[57] ABSTRACT

An exhaust gas recirculation control system for a vehicle diesel engine with an exhaust gas recirculation passage, including: a fluid pressure operated exhaust gas recirculation valve which controls flow resistance of the recirculation passage according to a control fluid pressure supplied thereto so as to increase the flow resistance up to a maximum substantially infinite value as the control fluid pressure approaches atmospheric pressure; an electrically operated switching over valve, which, when actuated, changes over the control fluid pressure supplied to the exhaust gas recirculation control valve to atmospheric pressure, and an exhaust gas recirculation control signal generating system which generates the control fluid pressure supplied to the exhaust gas recirculation control valve to operate it regularly as well as an electrical signal which actuates the switching over valve when the rate of change of engine load is greater than a certain predetermined value.

3 Claims, 3 Drawing Figures

DIESEL ENGINE EXHAUST GAS RECIRCULATION CONTROL SYSTEM

BACKGROUND OF THE INVENTION

The present invention relates to an exhaust gas recirculation system for a diesel internal combustion engine, and more particularly relates to such an exhaust gas recirculation system which reduce or eliminate smoke in the exhaust of the diesel internal combustion engine during rapid acceleration thereof.

Diesel internal combustion engines are nowadays widely used for propulsion of automotive vehicles, and the small scale type of diesel internal combustion engine suitable for small scale types of automotive vehicle such as passenger cars and light trucks is becoming more and more popular. For minimizing the exhaust emissions of diesel internal combustion engines, including particularly minimizing the production of nitrogen oxides or NOx in said exhaust emissions, and also including minimizing the amount of smoke or soot in said exhaust emissions, the method of exhaust gas recirculation is well known and effective. In this method, a part of the exhaust gases of the diesel internal combustion engine is abstracted from the exhaust system thereof and via an exhaust gas recirculation passage is fed into the air intake passage to mix with the air which is being sucked in therethrough to enter the combustion chambers of the diesel internal combustion engine and to be therein combusted together with liquid fuel injected into said combustion chambers. Thus this recirculated exhaust gas replaces a part of the air that would otherwise be sucked into these combustion chambers.

This admixture of exhaust gases into the air which is being sucked into the diesel internal combustion engine is effective for controlling the emission of harmful pollutants in the exhaust gases, including particularly for controlling the emission of smoke and soot in these exhaust gases, and also preserves good drivability of the diesel internal combustion engine, but it is necessary to regulate the amount of recirculated exhaust gases according to various criteria relating to the operational state of the diesel internal combustion engine. Generally, in the case of a diesel internal combustion engine, the so called excess air ratio, defined as $(A-R)/R$, where the symbol A represents the amount of air being sucked into the diesel internal combustion engine, and the symbol R represents the amount of air that is actually required to combust the liquid fuel which is being injected into the combustion chambers thereof, decreases along with increase in engine load.

Now, in the case of a diesel internal combustion engine which is being provided with exhaust gas recirculation, it is not proper to admit more recirculated exhaust gases to the air intake system of the engine than this amount of excess air, because otherwise the amount of air in the combustion chambers of the diesel internal combustion engine will become insufficient to combust the amount of fuel that is being injected into said combustion chambers, and accordingly incomplete combustion of this fuel will result, which will cause the emission of serious quantities of HC and CO and other undersirable hydrocarbons in the exhaust gases of the diesel internal combustion engine, as well as the emission of considerable quantities of soot and smoke therein. Therefore the process of exhaust gas recirculation must be controlled so that the exhaust gas recirculation ratio should decrease in response to an increase in engine load.

One way in which this control of exhaust gas recirculation has been performed in the past is to sense the position of a fuel metering element of the diesel fuel injection pump of the diesel internal combustion engine, i.e. the amount of rotation of a spill ring therein or the amount of rotation of a pump operating lever or the like, and according to this position, and also according to other engine operating parametrs such as temperature of the cooling water, temperature of the intake air, pressure in the intake air passage, engine revolution speed, etc., to generate a control fluid pressure for operating a fluid pressure operated exhaust gas recirculation control valve which includes a diaphragm actuator and controls the effective flow resistance of the exhaust gas recirculation passage which recirculate the exhaust gases as explained above.

However, a difficulty has arisen with regard to the operation of such a prior art exhaust gas recirculation control system, as follows. The diesel fuel injection pump has a relatively quick response to change of position of the fuel metering or controlling element thereof, and accordingly when the accelerator pedal of the vehicle (which controls the position of said fuel metering or controlling element) is rapidly depressed in order rapidly to accelerate the vehicle which is powered by the diesel internal combustion engine, then the engine load, i.e. the amount of diesel fuel injected per one fuel injection pulse by the fuel injection pump, increases very quickly. However, the fluid pressure operated exhaust gas recirculation control system has a relatively slow response to change of position of the fuel metering or controlling element of the fuel injection pump, and accordingly when the accelerator pedal of the vehicle which controls the position of said fuel metering or controlling element is rapidly depressed in order rapidly to accelerate the vehicle which is powered by the diesel internal combustion engine, then the amount of exhaust gas recirculation provided by said exhaust gas recirculation control system decreases rather slowly. Thus, a tendency exists for the amount of exhaust gas recirculation not to be decreased quickly enough corresponding to the increase in fuel injection amount, when the accelerator pedal of the vehicle is rapidly depressed in order rapidly to accelerate the vehicle, and this means that during said rapid acceleration for a certain transient time an excessive amount of exhaust gas recirculation is provided for the diesel internal combustion engine. This can lead to the emission of an unacceptable amount of HC and CO and of other undesirable hydrocarbons such as soot and smoke in the exhaust gases of the diesel internal combustion engine.

It should be understood that this problem is not specifically a problem that occurs during high vehicle acceleration during conditions of high engine load. Rather, it is a problem which manifests itself during conditions of rapid increase of engine load, i.e. during rapid depression of the accelerator pedal of the vehicle, i.e. during conditions of high rate of change of acceleration, or high jerk, of the vehicle (jerk being defined as the differential coefficient of the engine load).

SUMMARY OF THE INVENTION

Accordingly, it is the primary object of the present invention to provide an exhaust gas recirculation control system for a diesel internal combustion engine, which provides good overall response during conditions of rapidly increasing engine load, as for example during rapid acceleration of the vehicle incorporating the diesel internal combustion engine.

It is a further object of the present invention to provide an exhaust gas recirculation control system for a diesel internal combustion engine, which provides good drivability for the vehicle incorporating said diesel internal combustion engine.

It is a further object of the present invention to provide an exhaust gas recirculation control system for a diesel internal combustion engine, which provides reduced exhaust emissions for the vehicle incorporating the diesel internal combustion engine, during conditions of rapidly increasing engine load, as for example during rapid acceleration of the vehicle incorporating the diesel internal combustion engine.

It is a further object of the present invention to provide an exhaust gas recirculation control system for a diesel internal combustion engine, which provides in particular reduction of smoke and soot emissions for the vehicle incorporating the diesel internal combustion engine, during conditions of rapidly increasing engine load, as for example during rapid acceleration of the vehicle incorporating the diesel internal combustion engine.

It is a yet further object of the present invention to provide an exhaust gas recirculation control system for a diesel internal combustion engine, which provides temporary shutting down of exhaust gas recirculation, during conditions of rapidly increasing engine load, as for example during rapid acceleration of the vehicle incorporating the diesel internal combustion engine.

It is a yet further object of the present invention to provide an exhaust gas recirculation control system for a diesel internal combustion engine, which guarantees that excess of exhaust gas recirculation, during conditions of rapidly increasing engine load, as for example during rapid acceleration of the vehicle incorporating the diesel internal combustion engine, will not occur.

According to the most general device aspect of the present invention, these and other objects are accomplished by, for a diesel engine for a vehicle, comprising an air intake passage, an exhaust passage, and an exhaust gas recirculation passage whose upstream end is communicated to an intermediate point of said exhaust passage and whose downstream end is communicated to an intermediate point of said air intake passage: an exhaust gas recirculation control system, comprising: (a) a fluid pressure operated exhaust gas recirculation valve which controls the flow resistance of said exhaust gas recirculation passage according to a control fluid pressure supplied thereto so as to increase the flow resistance to a maximum substantially infinite valve as the control fluid pressure approaches atmospheric pressure; (b) an electrically operated switching over valve which, when actuated, changes over said control fluid pressure supplied to said exhaust gas recirculation control valve to atmospheric pressure; and (c) an exhaust gas recirculation control signal generating system, including a means for detecting engine load and jerk, which outputs a first fluid pressure control signal which is supplied to said exhaust gas recirculation control valve as said control fluid pressure so as to provide an appropriate amount of exhaust gas recirculation according to engine load, and a second electric control signal which actuates said switching over valve when the rate of change of engine load is greater than a certain predetermined value.

According to such a structure, since the exhaust gas recirculation control signal generating system outputs such an electric control signal to said switching over valve as to ensure that substantially no exhaust gas recirculation for said diesel internal combustion engine is made available, when the rate of change of engine load is greater than said certain predetermined value, thereby it is ensured that during such conditions of rapid increase of vehicle acceleration it cannot occur that too much exhaust gas recirculation is provided to the diesel internal combustion engine due to slowness of response of the fluid pressure operated exhaust gas recirculation system; and hence emission of soot and smoke in these transient circumstances is positively prevented.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENTS

Figure 1:
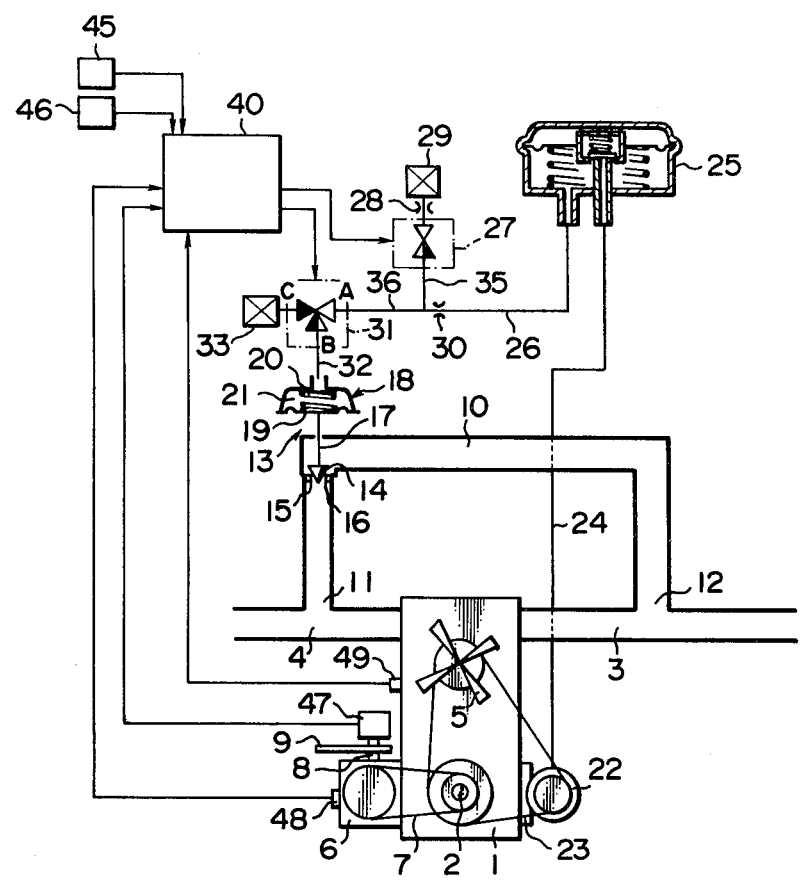
FIG. 1 is a partly schematic partly cross sectional drawing, showing the relevant parts of a diesel internal combustion engine which is equipped with said preferred embodiment of the diesel exhaust gas recirculation control system according to the present invention.

The present invention, will now be described with reference to a preferred embodiment thereof, and with reference to the appended drawings. FIG. 1 is a partly schematic partly cross sectional view, showing the essential parts of a preferred embodiment of the diesel exhaust gas recirculation control system according to the present invention, which is being used for controlling a diesel internal combustion engine 1 of a per se well known sort. The diesel internal combustion engine 1 comprises a crankshaft 2 which rotates in a per se well known fashion, an air intake passage 3 through which said diesel internal combustion engine 1 sucks air into its combustion chambers (which are not shown), and an exhaust passage 4 through which said diesel internal combustion engine 1 exhausts the exhaust gases which are produced by combustion in said combustion chambers. And the diesel internal combustion engine 1 is provided with a fan 5 for cooling it, which is belt driven via a belt 23 from said crankshaft 2.

Pulses of diesel fuel of appropriate magnitude are injected into the combustion chambers of the diesel internal combustion engine 1 at appropriate timing instants through fuel injection nozzles which are fitted to said combustion chambers but which are not shown in the figure either by a fuel injection pump 6, which may be a per se well known sort of diesel fuel injection pump such as a Bosch type VE fuel injection pump, and which is driven via a belt type transmission device 7 by the crankshaft 2 of the diesel internal combustion engine 1 in a fixed phase relationship with respect thereto. The amount of diesel fuel injected in each pulse of fuel injection provided by the fuel injection pump 6 through the relevant fuel injection nozzle, which of course corresponds to the load on the diesel internal combustion engine 1, is in fact determined according to the rotational position of a pump shaft 8 of the fuel injection pump 6, to which there is rotationally coupled a pump lever 9, so that said pump lever 9 rotationally drives said pump shaft 8. Although it is not particularly so shown in the figure, the pump lever 9 is rotationally driven by a linkage connected to an accelerator pedal fitted to the vehicle which is powered by the diesel internal combustion engine 1, said accelerator pedal being adapted to be depressed by the foot of an operator or driver of said vehicle, and said accelerator pedal, when so depressed, rotating the pump lever 9 and the pump shaft 8 in such a rotational direction as to increase the amount of diesel fuel provided to the combustion chambers of the diesel internal combustion engine 1, i.e. in such a rotational direction as to increase the load on the diesel internal combustion engine. The sensor member of an engine load and jerk amount sensor 47, which will be described later with regard to its structure and function, in this preferred embodiment, is coupled to the movement of said pump shaft 8 and said pump lever 9, so that said engine load and jerk amount sensor 47 provides a pair of output signals determined by the rotational position of said pump shaft 8 and said pump lever 9 and by the rate of change of said rotational position, in other words determined by the load on the diesel internal combustion engine 1 and by the rate of change of said engine load, as will be explained in detail later.

As an alternative, the amount of fuel provided in one fuel injection pulse by the fuel injection pump 6 could be arranged to depend on the position of a metering member which was positioned by a governor mechanism of any of several per se well known sorts, the relevant members being included in the pump 6, and the position of the pump shaft 8 and of the pump lever 9 could be arranged to be an input to this governor mechanism; in such a case, the movement of the aforesaid sensor member of the engine load and jerk amount sensor 47 should be coupled to the movement of said metering member of the fuel injection pump 6, so that the pair of output signals of said engine load and jerk amount sensor 47 should depend on the actual load on the diesel internal combustion engine 1 and upon the rate of change thereof (and not, for instance, on the amount of depression of said accelerator pedal and the rate of change thereof).

The upstream end of an exhaust gas recirculation passage 10 is connected to an exhaust gas take out port 11 which is provided at an intermediate part of the exhaust passage 4, so that a part of the flow of the exhaust gases which have been produced by combustion in the combustion chambers (not shown) of the diesel internal combustion engine 1 and which are flowing through said exhaust passage 4 is diverted so as instead to flow into said upstream end of said exhaust gas recirculation passage 10. The downstream end of said exhaust gas recirculation passage 10 is connected to a recirculated exhaust gas input port 12 which is provided at an intermediate part of the air intake passage 3, so that said recirculated exhaust gases which have flowed through the exhaust gas recirculation passage 10 are injected into the air intake system of the engine 1, so as to provide the per se well known function of exhaust gas recirculation. There is located at an intermediate point along the exhaust gas recirculation passage 10 an exhaust gas recirculation control valve assembly generally designated by the reference numeral 13. This exhaust gas recirculation control valve assembly 13 controls the flow resistance of said exhaust gas recirculation passage 10, so as to control the above described flow of recirculated exhaust gases through the exhaust gas recirculation passage 10 from the exhaust passage 4 to the air intake passage 3, according to the value of a vacuum signal supplied to said exhaust gas recirculation control valve assembly 13 as will be described later, so as to provide more or less exhaust gas recirculation for the diesel internal combustion engine 1, according to the operational conditions thereof.

Now the construction of this exhaust gas recirculation control valve assembly 13 will be explained. The exhaust gas recirculation control valve assembly 13 comprises a valve port element 16 formed with a valve seat 15, which is provided at said intermediate portion of the exhaust gas recirculation passage 10, and a valve element 14 which cooperates with said valve seat 15 of said valve port element 16, so that the flow resistance through the exhaust gas recirculation passage 10 is controlled by the amount of said valve element 14 being displaced away from said valve seat 15 of said valve port element 16, thereby determining the effective opening area of the hole through said valve port element 16.

The valve element 14 is mounted on the lower end in the figure of a valve rod 17, the other or upper end in the figure of which is connected to the diaphragm 19 of a diaphragm actuator device 18. The diaphragm 19 is biased in the downwards direction in the figure by a compression coil spring 20 which is mounted within a diaphragm chamber 21 of said diaphragm actuator device 18, and on the other hand the diaphragm 19 is biased upwards in the figure by the vacuum present within said diaphagm chamber 21. Accordingly, the greater is the value of the vacuum present in said diaphragm chamber 21, the greater is the upwards force on the diaphragm 19 in the figure which opposes the downwards force exerted by said compression coil spring 20; and hence the higher as seen in the figure is the shifted position of said diaphragm 19 with the valve element 14 more removed from the valve seat 15 of the valve port element 16, so that the greater is the amount of exhaust gas recirculation provided to the diesel internal combustion engine 1. On the other hand, the less is the value of the vacuum present in said diaphragm chamber 21, vice versa, the less is the amount of exhaust gas recirculation provided to the diesel internal combustion engine 1. The actuating vacuum to the diaphragm chamber 21 is provided via a vacuum conduit 32 from a source which will be explained in detail in what follows.

A vacuum pump 22 is provided to said diesel internal combustion engine 1 and is driven from the crankshaft 2 thereof by the same belt 23 as drives the fan 5 as already explained, so that the vacuum pump 22 is arranged to generate a continuous supply of vacuum whenever the diesel internal combustion engine 1 is running. The vacuum thus generated by this vacuum pump 22 is fed via a vacuum conduit 24 to a constant vacuum regulator valve 25 of a per se well known sort. This constant vacuum regulator valve 25 regulates the value of this vacuum to a substantially constant pressure value, hereinafter termed the line vacuum pressure value, and outputs said line vacuum to a vacuum conduit 26. At an upstream portion of this vacuum conduit 26, as viewed with respect to the flow of vacuum, there is provided a throttling element 30, and further at the downstream side of the throttling element 30 there joins an air conduit 35, in order to regulate the flow of vacuum through the vacuum conduit 26 from the constant vacuum regulator valve 25 to the downstream end of said vacuum conduit 26, as will be seen later.

The air conduit 35 extends from its end joined to said vacuum conduit 26 via an electrically actuated ON/OF switching valve 27 and via another throttling element 28 to an air filter 29 which is communicated to the atmosphere. The electrically actuated ON/OFF switching valve 27 is of a per se well known type including (for example) a solenoid and having two ports, which are communicated together when said solenoid is not supplied with actuating electrical energy, but on the other hand which are not communicated together when said solenoid is supplied with actuating electrical energy. This solenoid of the electrically actuated ON/OFF switching valve 27 is selectively supplied with actuating electrical energy by an electrical control device 40 which will be described later with regard to its structure and function. In fact, the electrical control device 40 alternately supplies actuating electrical energy to said electrically actuated ON/OFF switching valve 27, with a certain pulse ratio or duty ratio; and thus said electrically actuated ON/OFF switching valve 27 is repeatedly and rapidly opened and closed with a duty ratio of opening and closing corresponding to the duty ratio of said electrical signal output by the electrical control device 40. That is to say, the proportion of time tha the electrically actuated ON/OFF switching valve 27 is closed corresponds to said duty ratio of said electrical signal supplied thereto by the electrical control device 40, said duty ratio being defined as the proportion of time that said signal assumes an ON value. Because of the provision of the two throttling elements 28 and 30, which respectively slow the transmission of air through the air conduit 35 and slow the transmission of vacuum through the vacuum conduit 26, therefore, the vacuum value present at the point of the vacuum conduit 26 where the air conduit 35 joins thereto is thus determined to be greater or less, according as the duty ratio of said electrical signal outputted by the electrical control device 40 to the electrically actuated ON/OFF switching valve 27 is greater or less, and corresponds to and is determined by the current value of said duty ratio.

From the junction point of the vacuum conduit 26 where the air conduit 35 joins thereto at which this vacuum value corresponding to the duty ratio of the electrical signal output by the electrical control device 40 is produced, this vacuum value is communicated to a first port designated as "A" of an electrically actuated two way switching valve 31, via a vacuum conduit 36. A second port designated as "B" of this electrically actuated two way switching valve 31 is communicated via the aforementioned vacuum conduit 32 to said diaphragm chamber 21 of said diaphragm actuator device 18, so as to supply said diaphragm device 18 with actuating vacuum, and a third port of this electrically actuated two way switching valve 31, designated as "C", is communicated via an air filter 33 to the atmosphere and is thus always supplied with air at substantially atmospheric pressure.

This electrically actuated two way switching valve 31 is of a per se well known type, and includes (for example) a solenoid, and has three ports, designated as "A", "B", and "C" in the figure. When said solenoid is not supplied with actuating electrical energy, the ports "A" and "B" are communicated together while the port "C" is not communicated to any other port of said electrically actuated two way switching valve 31; but, on the other hand, when said solenoid is supplied with actuating electrical energy, the ports "B" and "C" are communicated together while the port "C" is not communicated to any other port of said electrically actuated two way switching valve 31. This solenoid of the electrically actuated two way switching valve 31 is selectively supplied with actuating electrical energy by the electrical control device 40 which as stated above will be described later with regard to its structure and function.

Thus, as will be readily understood, provided that the electrically actuated two way switching valve 31 is not supplied with actuating electrical energy by the electrical control device 40, then its two ports "A" and "B" are kept communicated together while its port "C" is not communicated to any other port, and thus the aforementioned vacuum present in the vacuum conduit 36 which corresponds to the duty ratio of the pulse signal provided by the electrical control device 40 to the electrically actuated ON/OFF switching valve 27 is transmitted directly through said electrically actuated two way switching valve 31 to the diaphragm chamber 21 of the diaphragm actuator device 18 without being affected by said electrically actuated two way switching valve 31, thus causing said diaphragm actuator device 18, to be controlled according to the duty ratio of said pulse signal. In this case, the greater is the duty ratio of said pulse signal, the greater is the vacuum supplied to the diaphragm chamber 21, and hence the greater is the amount of effective opening of the hole through said valve port element 16.

On the other hand, when the electrically actuated two way switching valve 31 is supplied with actuating electrical energy by the electrical control device 40, then its two ports "B" and "C" are communicated together while the port "A" is not communicated to any other port, and thus the aforementioned vacuum present in the vacuum conduit 36 which corresponds to the duty ratio of the pulse signal provided by the electrical control device 40 to the electrically actuated ON/OFF switching valve 27 is intercepted by the electrically actuated two way switching valve 31, and is not transmitted to the diaphragm chamber 21 of the diaphragm actuator device 18, which instead is supplied with air at substantially atmospheric pressure transmitted from the atmosphere through the air filter 33 and through the electrically actuated two way switching valve 31 and the conduit 32. Thus said diaphragm actuator device 18 is caused to be in the fully relaxed position, with its diaphragm 19 fully displaced in the downwards direction as seen in the figure by the compression action of the compression coil spring 20, thus pressing the valve element 14 against the valve seat 15 of the valve port element 16 by way of the valve rod 17 and intercepting fully the hole through said valve port element 16, thus fully cutting off exhaust gas recirculation through the exhaust gas recirculation passage 14.

Figure 2:
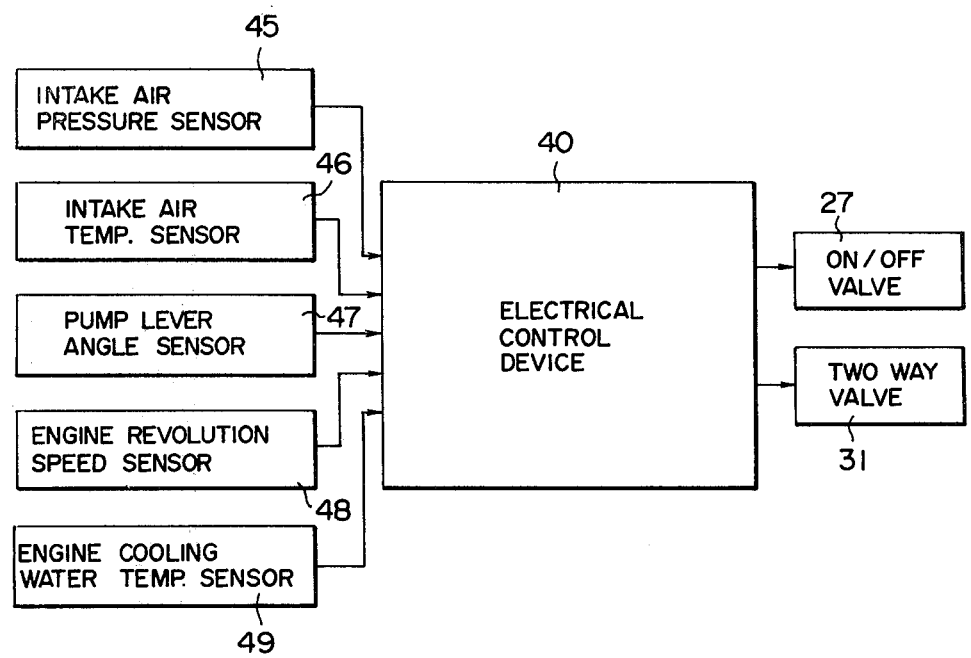
FIG. 2 is a block diagram, showing an electrical control device included in said preferred embodiment of the diesel exhaust gas recirculation control system according to the present invention, and also showing schematically certain sensors which provide input signals to said electrical control device and certain electrically actuated valves which are controlled by said electrical control device.

As stated earlier, the appropriate supply of actuating electrical energy to the electrically actuated ON/OF switching valve 27 and to the electrically actuated two way switching valve 31, i.e. the supply of a pulsating electrical signal of the appropriate duty ratio to the electrically actuated ON/OFF switching valve 27 and the supply of a steady electrical signal whose value is appropriately either high or low (that is, is either ON or OFF) to the electrically actuated two way switching valve 31, is made by the electrical control device 40, based upon the values of certain input signals which it receives. In the shown preferred embodiment of the diesel exhaust gas recirculation control system according to the present invention this electrical control device 40 inputs signals from the following sensors (as may be understood from the schematic representation of the electrical control device 40 and of the sensors which provide input signals to it which is given in FIG. 2): a per se well known intake air pressure sensor 45 which senses the pressure of the air which is being sucked into the combustion chambers of the diesel internal combustion engine 1 through the intake passage 3 and which outputs an electrical signal indicative of said pressure; a per se well known intake air temperature sensor 46 which senses the temperature of said air being sucked into the internal combustion engine 1 through the intake passage 3 and which outputs an electrical signal indicative of said temperature; the engine load and jerk amount sensor 47, already mentioned above, which will be explained in detail later, and which in fact is a combined sensor which outputs two electrical signals to the electrical control device 40, a first electrical signal indicative of the angular position of the pump lever 9 and of the pump shaft 8, i.e. indicative of the load on the diesel internal combustion engine 1, and a second electrical signal indicative of the rate of change of said angular position of the pump lever 9 and of the pump shaft 8, i.e. indicative of the jerk being produced by the diesel internal combustion engine 1; an engine revolution speed sensor 48 or a per se well known type, which senses the revolution speed of the crankshaft 2 of the diesel internal combustion engine 1 and which outputs an electrical signal indicative of said revolution speed; and an engine cooling water temperature sensor 49, again of a per se well known type, which senses the temperature of the cooling water of the diesel internal combustion engine 1 and which outputs an electrical signal indicative of said temperature.

In the following, the function of the electrical control device 40 will be described, as it is comprised in the functioning of the shown preferred embodiment of the exhaust gas recirculation control system according to the present invention. No particular structure will be described for this electrical control device 40, because, based upon the description of the function thereof given herein, and based upon various forms of prior art exhaust gas recirculation electrical control device for various prior art exhaust gas recirculation control systems, various possible structures for such an elecrrical control device 40 can easily be conceived of by one of ordinary skill in the relevant art. For example, the electrical control device 40 may comprise a microcomputer with various programs stored in the memory thereof, and may further comprise various analog to digital and digital to analog converters of per se well known sorts which interface between the above described sensors and said microcomputer, and between said microcomputer and said electrically actuated ON/OFF switching valve 27 and said electrically actuated two way switching valve 31; and the details of the control programs for such a microcomputer will be easily conceived of by one of ordinary skill in the microprogramming art, based upon the functional disclosures relating to the overall control function of the electrical control device 40 contained in this specification. Alternatively, the electrical control device 40 may comprise various specialized electronic circuits for performing the functions explained herein and quite possibly other functions which are per se well known; and, again, the details of such specialized electronic circuits will be easily conceived of by one of ordinary skill in the art, based upon the functional disclosures in this specification.

Figure 3:
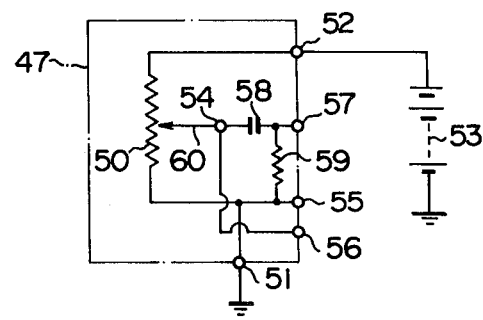
FIG. 3 is a circuit diagram, showing the particular construction of a combined engine load and jerk amount sensor incorporated in said preferred embodiment of the diesel exhaust gas recirculation control system according to the presnt invention, said engine load and jerk amount sensor providing two separate input signals (one corresponding to engine load, and one corresponding to rate of change of engine load, i.e jerk) to said electrical control device shown in FIGS. 1 and 2.

Now an explanation will be given of the engine load and jerk amount sensor 47 which is used in this shown preferred embodiment of the exhaust gas recirculation control system according to the present invention and which is shown in FIG. 3 by a circuit diagram and in FIGS. 1 and 3 by blocks.

This engine load and jerk amount sensor 47 comprises a variable resistor, which includes a resistor element 50 and a slider 60. The two ends of the resistor element 50 are connected to two terminals 51 and 52 on the outside of the case of the engine load and jerk amount sensor 47, said case being schematically shown in FIG. 3 by a single dotted line. The terminal 51 connected to one end of the resistor element 50 is connected to ground or earthed, and the terminal 52 connected to the other end of the resistor 50 is supplied with a constant voltage by the battery 53 of the vehicle incorporating this exhaust gas recirculation control system. Another signal output terminal 55 on the case of the engine load and jerk amount sensor 47 is connected to the grounded or base end of the resistor element 50. Thus, a steady voltage gradient is present in the resistor element 50, from its one end connected to the terminal 52 which is at a maximum voltage potential to its other end connected to the terminal 51 which is at zero voltage potential.

The slider 60 of the variable resistor, which slides along the resistor element 50 and samples the voltage therein at the spot thereof which said slider 60 touches, is electrically connected to another signal output terminal 56 on the case of the engine load and jerk amount sensor 47, at which there appears therefore a voltage signal which is determined by the position of said slider 60. This slider 60 is rotatably mounted around a shaft 54, and in fact (although it is not so shown explicitly in any of the figures) this shaft 54 is coincident with the central axis of the pump shaft 8 of the diesel fuel injection pump 6, the angular position of which determines the amount of fuel injected into the combustion chambers of the diesel internal combustion engine 1 in each pulse of fuel injection, i.e. the load on the diesel internal combustion engine 1, as stated earlier. Further, the slider 60 is rotationally connected to the movement of this pump shaft 8 and of the pump lever 9 mounted fixedly thereon, so that the position of said slider 60 is indicative of said rotational position of said pump shaft 8 and of said pump lever 9, i.e. is indicative of the load on the diesel internal combustion engine 1. Accordingly, it will be easily understood that therefore the voltage signal appearing at the output terminal 56, i.e. the voltage signal present between said output terminal 56 and the grounded terminal 55, is indicative of the load on the diesel internal combustion engine 1.

Further, this slider 60 is also electrically connected, via a capacitor 58, to another output terminal 56, and said output terminal 56 is also connected via a resistor 59 to the grounded terminal 55 on said case. Thus, if the slider 60 is stationary, at whatever position said slider 60 may be positioned as touching the resistor element 50, any voltage between the output terminal 57 and the grounded terminal 55 will be discharged through the resistor 59, so no output signal will be present between said output terminal 57 and the grounded terminal 55; but, on the other hand, if the slider 60 is not stationary but is moving along the resistor element 50, then a voltage signal will be produced between the output terminal 57 and the grounded terminal 55, said voltage signal having passed through the capacitor 58. This voltage signal will be greater, the quicker the slider 60 is moving along the resistor element 50, and it will take some certain characteristic time for this voltage signal to disappear after the stopping of the motion of the slider 60 along the resistor element 50 by being discharged through the resistor 59. Accordingly it is seen that the output signal present between said output terminal 57 and the grounded terminal 55, is indicative of the rate of change of the position of the slider 60 on the resistor element 50 which corresponds to the rotational position of said pump shaft 8 and of said pump lever 9, i.e. is indicative of the rate of change of the load on the diesel internal combustion engine 1. Thus, this output signal present at the output terminal 57 of the engine load and jerk amount sensor 47 is indicative of the rate of change of the acceleration of the vehicle incorporating the diesel internal combustion engine 1, i.e. is indicative of the jerk which said vehicle is undergoing, or the third differential coefficient of the position thereof.

The output signals present at these two output terminals 56 and 57 of the engine load and jerk amount sensor 47 are the signals which are sent from said engine load and jerk amount sensor 47 to the electrical control device 40 as signals which are informative, as stated above, of the load on the diesel internal combustion engine 1 and the rate of change of said load. Now, the mode of operation of this electrical control device 40 will be explained.

If the output signal present at the output terminal 57 of the engine load and jerk amount sensor 47 supplied to the electrical control device 40 is indicative of a rate of change of the load on the diesel internal combustion engine 1 which is less than a certain predetermined value, then the electrical control device 40 outputs an electrical signal to the electrically actuated two way switching valve 31 which is a continuous OFF signal, and outputs a pulsating ON/OFF electrical signal to the electrically actuated ON/OFF switching valve 27 with a suitable duty ratio for causing the duty ratio of opening and closing of said electrically actuated ON/OFF switching valve 27 to be appropriate for generating such a value of vacuum in the vacuum conduit 36 for providing an appropriate amount of exhaust gas recirculation for the diesel internal combustion engine 1, said appropriate amount being calculated by the electrical control device 40 in a per se well known manner (for example, by table lookup) in view of the current operational conditions of said diesel internal combustion engine 1 which are signalled to the electrical control device 40 by the intake air pressure sensor 45, the intake air temperature sensor 46, the engine revolution speed sensor 48, the engine cooling water sensor 49, and further in view of the current value of load on the diesel internal combustion engine 1 as signaled to the electrical control device 40 by the value of the electrical output signal present at the output terminal 56 of the engine load and jerk amount sensor 47, which as stated above is representative of said engine load value, and which is transmitted to the electrical control device 40. This suitable vacuum value in the vacuum conduit 36 is transmitted at this time from the port "A" of the electrically actuated two way switching valve 31 to the port "B" thereof, and is then conducted to the diaphragm chamber 21 of the diaphragm actuator 18, so as to provide the proper amount of exhaust gas recirculation for the diesel internal combustion engine 1 in the current circumstances, as stated above. Thus the shown exhaust gas recirculation control system according to the preferred embodiment of the exhaust gas recirculation control system according to the present invention functions in its mode of providing a proper amount of exhaust gas recirculation for the diesel internal combustion engine 1.

On the other hand, if the output signal present at the output terminal 57 of the engine load and jerk amount sensor 47 supplied to the electrical control device 40 is indicative of a rate of change of the load on the diesel internal combustion engine 1 which is greater than said certain predetermined value, then the electrical control device 40 outputs an electrical signal to the electrically actuated two way switching valve 31 which is a continuous ON signal. In such a case, as explained above, the port "A" of the electrically actuated two way switching valve 31 is not communicated to any other port, and instead the port "B" thereof is communicated to the port "C" thereof which is communicated to the atmosphere. In this case, whatever be the value of the duty ratio of the signal supplied to the electrically actuated ON/OFF switching valve 27 by the electrical control device 40, it is immaterial from the point of view of actual operation of the exhaust gas recirculation control system shown, because the vacuum value in the vacuum conduit 36 is totally isolated and cut off from the diaphragm chamber 21 of the diaphragm actuator 18, said diaphragm chamber 21 being instead supplied with air at atmospheric pressure. Accordingly, as has been explained above, the diaphragm 19 of the diaphragm device 18 is displaced downwards in the figure by the compression coil spring 20 to its fullest possible extent so as, via the valve rod 17, to push the valve element 14 against the valve seat 15 of the valve port element 16, thus cutting off exhaust gas recirculation through the exhaust gas recirculation passage 10. Accordingly in this operational condition no substantial exhaust gas recirculation is provided for the diesel internal combustion engine 1.

Thus, provided that the diesel internal combustion engine 1 is not being sharply accelerated, i.e. when the rate of change of the angular position of the pump shaft 8 of the diesel fuel injection pump 6 is less than said certain predetermined value, then the shown exhaust gas recirculation control system is in the operational condition wherein port "A" of the electrically actuated two way switching valve 31 is communicated to port "B" thereof, so that the duty ratio of the signal dispatched to the electrically actuated ON/OFF switching valve 27 by the electrical control device 40 is able, by determining the value of the vacuum present in the vacuum conduit 36, to control the exhaust gas recirculation control valve assembly 13, and thus to provide an optimum exhaust gas recirculation amount for the diesel internal combustion engine 1, in a per se well known way; and in fact the exhaust gas recirculation ratio for the diesel internal combustion engine 1 is determined so as to be substantially inversely proportional to engine load, although this is not to be considered to be limitative of the present invention. On the other hand, if the diesel internal combustion engine is sharply accelerated, i.e. when the rate of change of the angular position of the pump shaft 8 of the diesel fuel injection pump 6 becomes greater than said certain predetermined value, then the shown exhaust gas recirculation control system immediately transits to the operational condition wherein port "B" of the electrically actuated two way switching valve 31 is communicated to port "C" thereof, so that whatever be the duty ratio of the signal dispatched to the electrically actuated ON/OFF switching valve 27 by the electrical control device 40 immediately the supply of exhaust gas recirculation provided for the diesel internal combustion engine 1 ceases. Therefore during such rapid acceleration the danger of excessive exhaust gas recirculation caused by lack of responsiveness in the control system is obviated, and thus the possibility of the occurrence of soot in the exhaust gases of the engine is prevented. Of course, as soon as the rapid acceleration condition terminates, then the stopping of exhaust gas recirculation will also cease, because as soon as the electrical signal from the terminal 57 of the engine load and jerk amount sensor 47 indicates a rate of change of engine load which is lower than said predetermined value then the electrical control device 40 ceases supplying electrical energy to the electrically actuated two way switching valve 31, and hence the port "A" of the electrically actuated two way switching valve 31 once again is communicated to the port "B" thereof, thus recommencing the previously described per se well known performance of supply of exhaust gas recirculation to the diesel internal combustion engine 1.

The shown preferred embodiment of the exhaust gas recirculation control system according to the present invention employs a hardware means for producing a signal representative of the rate of change of the load on the diesel internal combustion engine 1, i.e. utilizes the circuit within the engine load and jerk amount sensor 47 terminating in the output terminal 57 of said engine load and jerk amount sensor 47 which is shown in FIG. 3. However, in fact, the present invention can be practiced without such special circuitry in the engine load and jerk amount sensor 47. In another possible embodiment of the exhaust gas recirculation control system according to the present invention this terminal 57 of the engine load and jerk amount sensor 47 is omitted, and the only signal that the engine load and jerk amount sensor 47 dispatches to the electrical control device 40 is the signal from its output terminal 56 which is indicative of the load on the diesel internal combustion engine 1. In the case of this modification, a value within the electrical control device 40 representative of the rate of change of said load on the diesel internal combustion engine 1 is produced by a process such as for example differentiation with respect to time, either by using a special differentiating circuit of a per se well known sort for performing this function, or, in the case that the electrical control device 40 comprises a microcomputer, performing this differentiation by means of steps in a computer program.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. For a diesel engine for a vehicle, comprising an air intake passage, an exhaust passage, and an exhaust gas recirculation passage whose upstream end is communicated to an intermediate point of said exhaust passage and whose downstream end is communicated to an intermediate point of said air intake passage.

an exhaust gas recirculation control system, comprising:

(a) a fluid pressure operated exhaust gas recirculation control valve which controls the flow resistance of said exhaust gas recirculation passage according to a control fluid pressure supplied thereto so as to increase the flow resistance to a maximum substantially infinite valve as the control fluid pressure approaches atmospheric pressure;

(b) an electrically operated switching over valve which, when actuated, changes over said control fluid pressure supplied to said exhaust gas recirculation control valve to atmospheric pressure; and (c) an exhaust gas recirculation control signal generating system, including a means for detecting engine load and jerk, which outputs a first fluid pressure control signal which is supplied to said exhaust gas recirculation control valve as said control fluid pressure so as to provide an appropriate amount of exhaust gas recirculation according to engine load, and a second electric control signal which actuates said switching over valve when the rate of change of engine load is greater than a certain predetermined value.

2. An exhaust gas recirculation control system according to claim 1, wherein said switching over valve is a three way valve having a first port connected to said control fluid pressure for controlling said exhaust gas recirculation control valve, a second port connected to said exhaust gas recirculation control valve, and a third port opened to the atmosphere, said first and second ports being communicated to one another while said third port is isolated from said first and second ports when said switching over valve is supplied with electrical energy, and said second and third ports being communicated together while said first port is isolated from said second and third ports when said switching over valve is not supplied with electrical energy.

3. An exhaust gas recirculation control system according to claim 1 or claim 2, wherein said means for detecting engine load and jerk includes an electric circuit including a variable resistor having a first resistor element and a slider which slides along said first resistor element, a series connection of a capacitor element and a second resistor element connected between said slider and one end of said first resistor element, an input terminal pair connected to the opposite ends of said first resistor element, a first output terminal pair connected to said slider and one end of said first resistor element, and a second output terminal pair connected to an intermediate portion of said series connection of said capacitor element and said second resistor element and one end of said first resistor element.

* * * * *